United States Patent
Yasuda

(10) Patent No.: US 9,973,444 B2
(45) Date of Patent: May 15, 2018

(54) RELAY SYSTEM AND SWITCHING DEVICE

(71) Applicant: Hitachi Metals, Ltd., Minato-ku, Tokyo (JP)

(72) Inventor: Makoto Yasuda, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 264 days.

(21) Appl. No.: 14/838,527

(22) Filed: Aug. 28, 2015

(65) Prior Publication Data

US 2016/0127270 A1     May 5, 2016

(30) Foreign Application Priority Data

Oct. 31, 2014    (JP) ................................ 2014-223504

(51) Int. Cl.
| | |
|---|---|
| H04L 12/947 | (2013.01) |
| H04L 12/741 | (2013.01) |
| H04L 12/721 | (2013.01) |
| H04L 12/935 | (2013.01) |
| H04L 12/709 | (2013.01) |

(52) U.S. Cl.
CPC ............ *H04L 49/25* (2013.01); *H04L 45/245* (2013.01); *H04L 45/54* (2013.01); *H04L 45/66* (2013.01); *H04L 45/74* (2013.01); *H04L 49/3009* (2013.01)

(58) Field of Classification Search
None
See application file for complete search history.

(56) References Cited

U.S. PATENT DOCUMENTS

| | | | | |
|---|---|---|---|---|
| 2013/0148662 A1* | 6/2013 | Kamble | .................. | H04L 45/66 370/392 |
| 2015/0304127 A1* | 10/2015 | Xiao | .................... | H04L 12/465 370/254 |
| 2016/0036728 A1* | 2/2016 | Duda | .................. | H04L 12/4633 370/357 |
| 2017/0070473 A1* | 3/2017 | Schlansker | ......... | H04L 12/6418 |

FOREIGN PATENT DOCUMENTS

| | | |
|---|---|---|
| JP | 2012-161027 A | 8/2012 |
| JP | 2012-209984 A | 10/2012 |

* cited by examiner

*Primary Examiner* — Kodzovi Acolatse
*Assistant Examiner* — Manuel Rangel
(74) *Attorney, Agent, or Firm* — Crowell & Moring LLP

(57) ABSTRACT

When relaying a frame received at a MCLAG port to a bridge port, a MCLAG identifier adding unit adds a MCLAG identifier to the frame. When an encapsulated frame to which a MCLAG identifier has been added is received at the bridge port and the encapsulation of the frame, is performed by a peer device, a learning information control unit does not learn an encapsulation address contained in the encapsulated frame. More specifically, the learning information control unit learns a source customer address contained in the frame in association with the MCLAG identifier added to the frame to the address table, but does not learn a source encapsulation address.

10 Claims, 9 Drawing Sheets

FIG. 7

FDB OF SWE1a

| CMAC | IVID | BMAC | PORT ID/ MCLAG ID |
|---|---|---|---|
| CA1a | xxx | -- | {MCLAG1} |
| CA1b | xxx | -- | {Pd} |
| CA1c | xxx | BA1b | {Pb} |
| CA2 | xxx | BA2 | {Pu} |
| CA3 | xxx | BA3 | {MCLAG2} |
| CA4 | xxx | BA4 | {Pb} |
| ... | ... | ... | ... |

FIG. 8A

32a: RECEPTION-SIDE IVID MANAGEMENT TABLE

| SVID + RECEPTION PORT ID | BVID + RECEPTION PORT ID | IVID |
|---|---|---|
| yyy+{Pd} | --- | xxx |
| --- | vvv+{Pu} | xxx |
| ... | ... | ... |

FIG. 8B

32b: TRANSMISSION-SIDE IVID MANAGEMENT TABLE

| IVID + TRANSMISSION PORT ID | SVID | ISID | BVID |
|---|---|---|---|
| xxx+{Pd} | yyy | --- | --- |
| xxx+{Pu} | --- | zzz | vvv |
| ... | ... | ... | ... |

FIG. 8C

21: MCLAG TABLE

| MCLAG ID | PORT ID | CONTROL STATE |
|---|---|---|
| {MCLAG1} | {Pm1} | FW |
| {MCLAG2} | {Pm2} | FW |
| ... | ... | |

RELAY SYSTEM AND SWITCHING DEVICE

CROSS-REFERENCE TO RELATED APPLICATION

The present application claims priority from Japanese Patent Application No. 2014-223504 filed on Oct. 31, 2014, the content of which is hereby incorporated by reference into this application.

TECHNICAL FIELD OF THE INVENTION

The present invention relates to a relay system and a switching device, for example, a relay system in which a link aggregation group is set across two switching devices to perform an operation based on PBB (Provider Backbone Bridge) standard and the switching device.

BACKGROUND OF THE INVENTION

Japanese Patent Application Laid-Open Publication No. 2012-161027 (Patent Document 1) discloses a configuration in which a node redundancy is applied to two edge switching devices disposed at the boundary of a MAC-in-MAC network. In this document, when MAC addresses of one device and the other device are defined as a my representative address and a mate representative address, respectively, each of two edge switching devices controls a stream of frames based on the combination of the my representative address and the mate representative address contained in a destination and a source of a frame. For example, when an encapsulated frame destined for a my representative address is received from a core switch and a destination customer address has not been learned, one of the two edge switching devices decapsulates the encapsulated frame and then relays it to an access port, and further relays the encapsulated frame to the other device via an IC port. Then, the other device also decapsulates the received encapsulated frame and then relays it to an access port.

Japanese Patent Application Laid-Open Publication No. 2012-209984 (Patent Document 2) discloses a configuration in which an inter-device link aggregation is set on each link between a customer edge in a user network and two provider edges in a MPLS network. When the two provider edges receive a packet from the customer edge, only one of the two provider edges relays the packet to the MPLS network based on a rule made in advance between the two provider edges.

SUMMARY OF THE INVENTION

As a redundant system, for example, a system in which two switching devices are connected to each other via bridge ports and a LAG is set on a plurality of ports including respective ports of the two switching devices as described in Patent Document 2 has been known. In this redundant system, unlike a common LAG set in one switching device, a LAG is set across two switching devices. Therefore, in addition to general effects obtained by the LAG such as the redundancy for the fault of communication lines and the expansion of communication band, the redundancy for the fault of switching devices can be achieved.

In this specification, the inter-device LAG as described above is referred to as a multi-chassis link aggregation group (hereinafter, abbreviated as MCLAG). Also, the assembly of the two switching devices on which MCLAG is set is referred to as MCLAG switch. Further, when viewed from one switching device of two switching devices, the other switching device is referred to as a peer device.

The MCLAG switch manages the inter-device ports, on which the same MCLAG is set, as logically one port. As one method for realizing it, when each of the two switching devices constituting the MCLAG switch relays a frame received at the port, on which MCLAG is set (hereinafter, referred to as MCLAG port), to the peer device via the bridge port, the switching device adds an identifier of the MCLAG to the frame. The peer device learns a source MAC address of the frame received at the bridge port in association with the identifier of the MCLAG to its own address table.

Further, as a technique for realizing a wide-area Ethernet, for example, the extended VLAN and the MAC-in-MAC have been known as described in Patent Document 1. The extended VLAN is standardized by IEEE 802.1ad, and is a technique for extending the number of VLANs (Virtual Local Area Network) by adding a service-provider VLAN tag to a customer VLAN tag based on IEEE 802.1Q. The MAC-in-MAC is a technique of encapsulating a customer MAC (Media Access Control) frame by a service-provider MAC frame, thereby achieving the further extension of the number of VLANs based on the extended VLAN and the reduction of the number of MAC addresses learned in a switch (core switch) in a wide-area network. As a detailed method of the MAC-in-MAC, PBB based on IEEE 802.1ah has been known.

Here, the inventors of the present invention have studied the application of the MCLAG switch to the edge switching device of the PBB network. In this case, the MCLAG switch can receive a frame from a customer network at any of the MCLAG ports of the two switching devices. Thus, each of the two switching devices receives a frame at its own MCLAG port or receives a frame received at the MCLAG port of the peer device at its own bridge port.

In the former case, the frame received at the MCLAG port is an unencapsulated frame, and in the latter case, the frame received at the bridge port may be an encapsulated frame as described in Patent Document 1. Thus, there are the case where the learning of the address table is executed based on an unencapsulated frame and the case where it is executed based on an encapsulated frame. Generally, the learning contents of the address table differ between the unencapsulated frame and the encapsulated frame. As a result, the situation may occur in which the learning contents of the address table are unnecessarily changed in spite of being intended for the same terminal or the like.

The present invention has been made in view of the problem mentioned above, and one object of the present invention is to provide a relay system and a switching device capable of preventing the unnecessary change of the learning contents of an address table.

The above and other objects and novel characteristics of the present invention will be apparent from the description of the present specification and the accompanying drawings.

The following is a brief description of an outline of the typical embodiment of the invention disclosed in the present application.

A relay system according to an embodiment of the present invention includes: a first switching device and a second switching device which are disposed at entrance or exit of a PBB network in which relaying based on a PBB standard is performed. Each of the first and second switching devices converts an unencapsulated frame received from outside of the PBB network into an encapsulated frame and relays the encapsulated frame to the PBB network, and converts the encapsulated frame received from the PBB network into the unencapsulated frame and relays the unencapsulated frame to the outside of the PBB network. The unencapsulated frame contains a customer address, and the encapsulated frame has a configuration in which an encapsulation address is added to the unencapsulated frame based on the PBB standard. Each of the first switching device and the second switching device includes: a lower-link port; an upper-link port; one or a plurality of MCLAG ports; a bridge port; an address table; and a relay processing unit which learns and retrieves the address table. The lower-link port transmits or receives the unencapsulated frame, and the upper-link port transmits or receives the encapsulated frame. An inter-device LAG is set on the one or a plurality of MCLAG ports, and the one or a plurality of MCLAG ports include a first MCLAG port serving as the lower-link port. The bridge port serves as the upper-link port and connects one device and a peer device. The address table retains the customer address present ahead of the lower-link port in association with a port identifier representing the lower-link port or a MCLAG identifier corresponding to the lower-link port. Also, the address table retains the customer address present ahead of the upper-link port in association with the encapsulation address and a port identifier representing the upper-link port or a MCLAG identifier corresponding to the upper-link port. The relay processing unit includes: a MCLAG identifier adding unit and a learning information control unit. When a frame received at the MCLAG port is relayed to the bridge port, the MCLAG identifier adding unit adds a MCLAG identifier corresponding to the MCLAG port to the frame. When the encapsulated frame to which the MCLAG identifier has been added is received at the bridge port and encapsulation of the frame is performed by the peer device, the learning information control unit learns a source customer address contained in the encapsulated frame in association with the MCLAG identifier added to the encapsulated frame to the address table. At this time, the learning information control unit does not learn the encapsulation address contained in the encapsulated frame to the address table.

The effects obtained by typical embodiments of the invention disclosed in the present application will be briefly described below. That is, in a relay system including a MCLAG switch, it is possible to prevent the unnecessary change of the learning contents of an address table.

BRIEF DESCRIPTIONS OF THE DRAWINGS

FIG. 7 is a schematic diagram showing a configuration example of the address table in FIG. 6;

FIG. 8A is a schematic diagram showing a configuration example of a reception-side IVID management table in FIG. 6;

FIG. 8B is a schematic diagram showing a configuration example of a transmission-side IVID management table in FIG. 6;

FIG. 8C is a schematic diagram showing a configuration example of a MCLAG table in FIG. 6.

DESCRIPTIONS OF THE PREFERRED EMBODIMENTS

Figure 1:
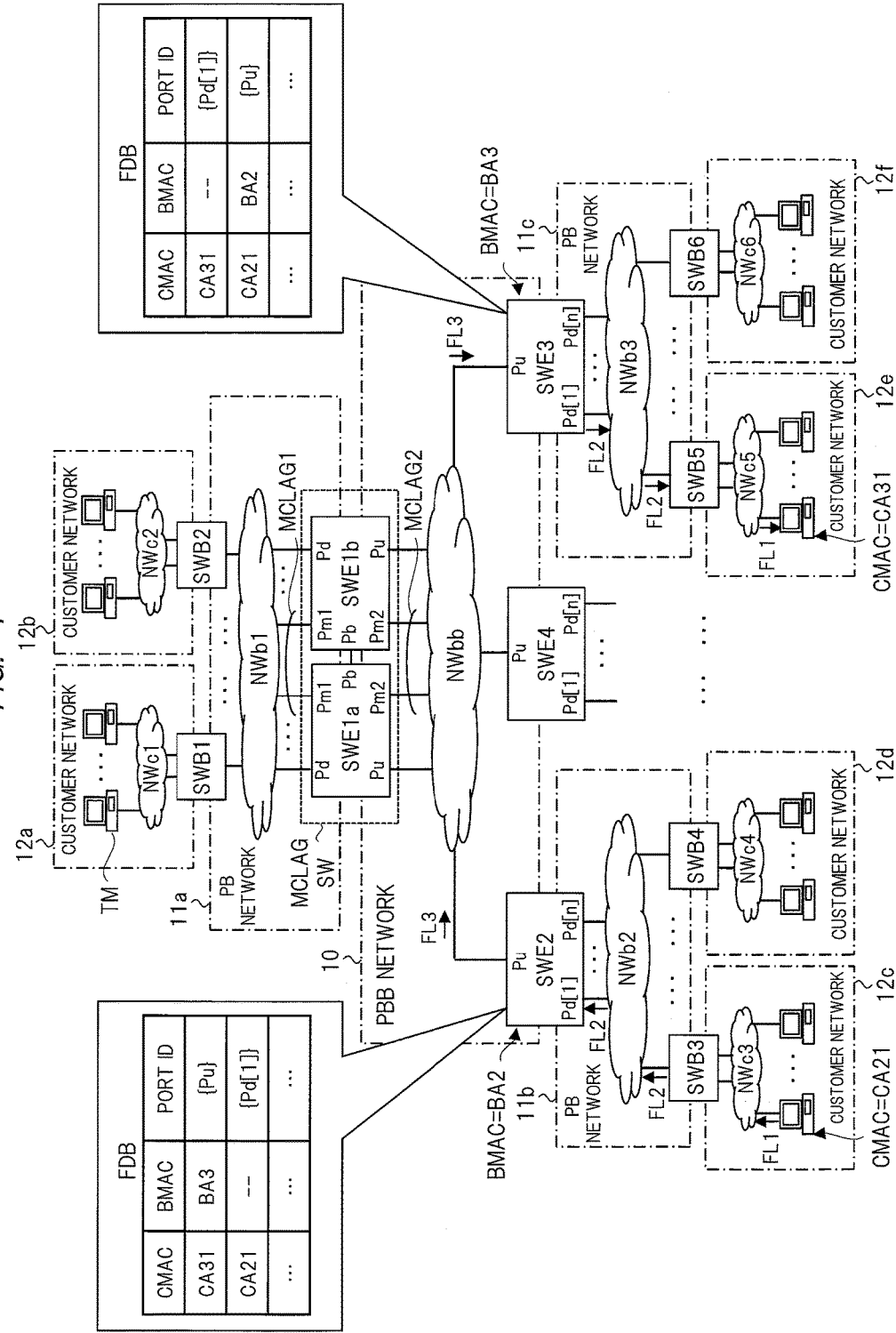
FIG. 1 is a schematic diagram showing an overall configuration example and an operation example of a relay system according to an embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

<<Overall Configuration of Relay System>>

FIG. 1 is a schematic diagram showing an overall configuration example and an operation example of a relay system according to an embodiment of the present invention. The relay system shown in FIG. 1 includes a plurality of (in this case, six) customer networks 12a to 12f, a plurality of (in this case, three) PB networks 11a to 11c for relaying between the customer networks 12a to 12f and a PBB network 10 for relaying between the PB networks 11a to 11c.

The PB network 11a handles relaying between the customer networks 12a and 12b, the PB network 11b handles relaying between the customer networks 12c and 12d, and the PB network 11c handles relaying between the customer networks 12e and 12f. The PBB network 10 is a relay network in which relaying based on IEEE802.1ah (in other words, PBB standard) is executed. The PB networks 11a to 11c are relay networks to which the above-described extended VLAN is applied.

Switches SWB1 and SWB2 are disposed at boundaries between the customer networks 12*a* and 12*b* and the PB network 11*a*, respectively. The customer network 12*a* includes a plurality of customer terminals TM and a network NWc1 which connects the customer terminals TM to the switch SWB1. The customer network 12*b* includes a plurality of customer terminals TM and a network NWc2 which connects the customer terminals TM to the switch SWB2. Each of the networks NWc1 and NWc2 is made up of, for example, communication lines and switches (not shown). The switch SWB1 handles relaying between the plurality of customer terminals TM in the customer network 12*a* and handles also relaying between each customer terminal TM and the PB network 11*a*. The switch SWB2 handles relaying between the plurality of customer terminals TM in the customer network 12*b* and handles also relaying between each customer terminal TM and the PB network 11*a*.

Similarly, switches SWB3 and SWB4 are disposed at boundaries between the customer networks 12*c* and 12*d* and the PB network 11*b*, respectively, and switches SWB5 and SWB6 are disposed at boundaries between the customer networks 12*e* and 12*f* and the PB network 11*c*, respectively. The customer networks 12*c* to 12*f* each include a plurality of customer terminals TM and networks NWc3 to NWc6, respectively. The switches SWB3 and SWB4 handle relaying between the plurality of customer terminals TM in the customer networks 12*c* and 12*d* and handle also relaying between each customer terminal TM and the PB network 11*b*. The switches SWB5 and SWB6 handle relaying between the plurality of customer terminals TM in the customer networks 12*e* and 12*f* and handle also relaying between each customer terminal TM and the PB network 11*c*.

At the boundary between the PB network 11*b* and the PBB network 10 (in other words, entrance or exit of PBB network 10), a switching device (specifically, edge switching device) SWE2 is disposed. The switching device SWE2 has a plurality of ports including n ports Pd[1] to Pd[n] serving as lower-link ports and a port Pu serving as an upper-link port. The PB network 11*b* is provided with a network NWb2 made up of, for example, communication lines and switches (not shown). The switches SWB3 and SWB4 are connected to any of the ports Pd[1] to Pd[n] of the switching device SWE2 through the network NWb2.

Thus, the switching device SWE2 handles relaying between the plurality of switches SWB3 and SWB4 present in its own lower link and handles also relaying between each of the switches SWB3 and SWB4 and the PBB network 10. Although the two switches SWB3 and SWB4 are disposed at the boundary of the PB network 11*b* in this case, more switches are disposed in practice. Also, in accordance with this, more customer networks are incorporated in the PB network 11*b* in addition to the two customer networks 12*c* and 12*d*. The same is true for the PB networks 11*a* and 11*c*.

Like the case of the PB network 11*b*, a switching device SWE3 is disposed at the boundary between the PB network 11*c* and the PBB network 10. The PB network 11*c* is provided with a network NWb3. The switches SWB5 and SWB6 are connected to any of the ports Pd[1] to Pd[n] of the switching device SWE3 through the network NWb3. Thus, the switching device SWE3 handles relaying between the plurality of switches SWB5 and SWB6 present in its own lower link and handles also relaying between each of the switches SWB5 and SWB6 and the PBB network 10. Furthermore, a switching device SWE4 is disposed at the boundary between a predetermined PB network (not shown) and the PBB network 10 in the same manner.

Meanwhile, at the boundary between the PB network 11*a* and the PBB network 10 (in other words, entrance or exit of PBB network 10), a MCLAG switch MCLAGSW made up of two switching devices (edge switching devices) SWE1*a* and SWE1*b* is disposed. Each of the switching devices SWE1*a* and SWE1*b* has lower-link ports and upper-link ports. In this example, the lower-link ports include a MCLAG port Pm1 and a port Pd on which MCLAG is not set. Also, the upper-link ports include a MCLAG port Pm2, a port Pu on which MCLAG is not set and a bridge port Pb.

Each of the switching devices SWE1*a* and SWE1*b* sets a common MCLAG1 on its own MCLAG port Pm1 and the MCLAG port Pm1 of a peer device, and sets a common MCLAG2 on its own MCLAG port Pm2 and the MCLAG port Pm2 of a peer device. The PB network 11*a* is provided with a network NWb1. The switches SWB1 and SWB2 are connected to any of the plurality of lower-link ports of the MCLAG switch MCLAGSW through the network NWb1. Thus, the MCLAG switch MCLAGSW handles relaying between the plurality of switches SWB1 and SWB2 present in its own lower link and handles also relaying between each of the switches SWB1 and SWB2 and the PBB network 10.

The PBB network 10 is provided with a network NWbb made up of, for example, communication lines and switches (specifically, core switches (not shown)). The upper-link ports (ports Pu) of the plurality of switching devices SWE2 to SWE4 and the upper-link ports (port Pu and MCLAG port Pm2) of the MCLAG switch MCLAGSW are connected to each other through the network NWbb. Although the case in which one of edge switching devices is made up of the MCLAG switch MCLAGSW has been described as an example, the other edge switching devices SWE2 to SWE4 may be made up of MCLAG switches.

<<Overall Operation of Relay System>>

Here, an operation example of the relay system of FIG. 1 will be described based the case where a frame is transferred from the customer terminal TM in the customer network 12*c* to the customer terminal TM in the customer network 12*e* in FIG. 1. In this case, a MAC address (customer address) CMAC of the customer terminal TM in the customer network 12*c* serving as a transmission source is "CA21" and a MAC address (customer address) CMAC of the customer terminal TM in the customer network 12*e* serving as a destination is "CA31". Also, a MAC address (encapsulation address) BMAC of the switching device SWE2 is "BA2" and a MAC address (encapsulation address) BMAC of the switching device SWE3 is "BA3".

Figure 2:
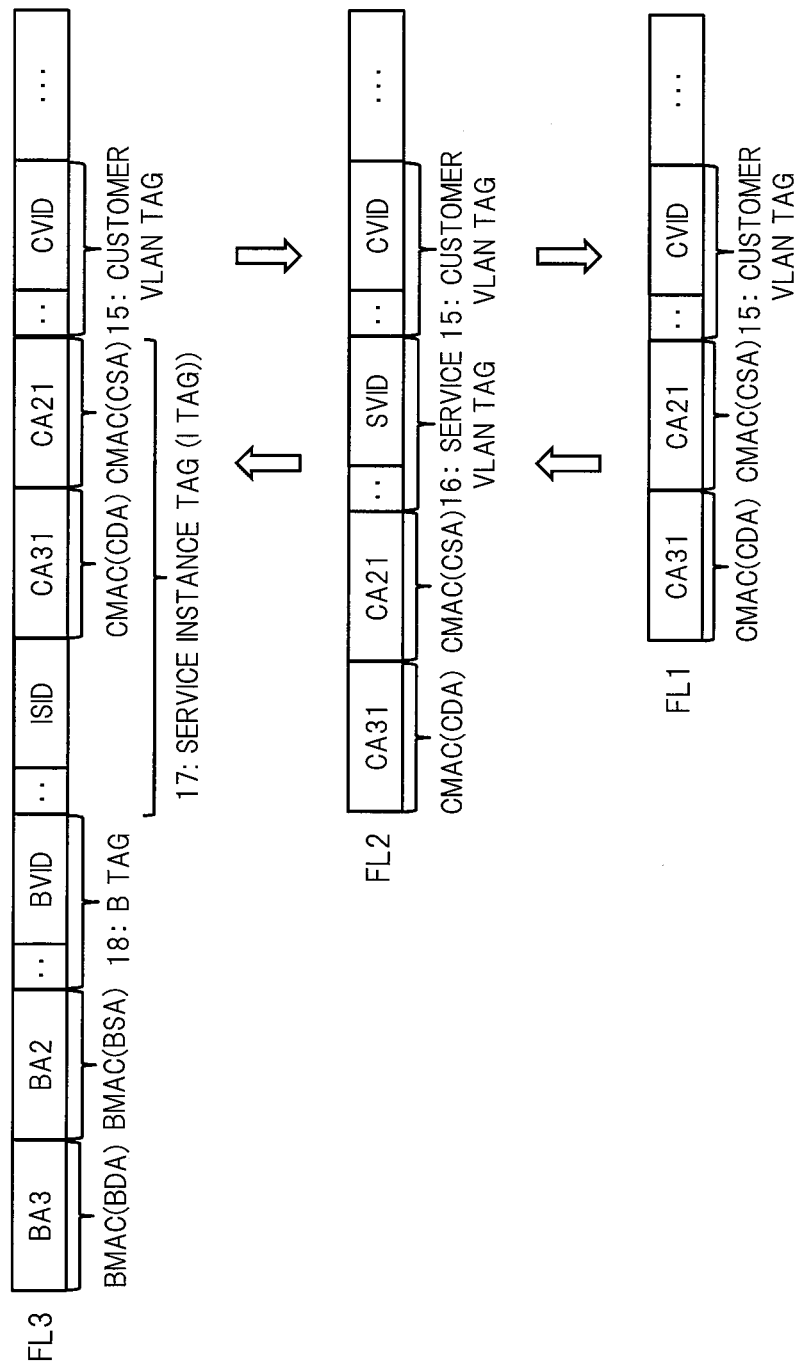
FIG. 2 is a diagram showing a configuration example of a main part of a frame flowing in each relay network in the relay system of FIG. 1.

FIG. 2 is a diagram showing a configuration example of a main part of a frame flowing in each relay network in the relay system of FIG. 1. As shown in FIG. 1 and FIG. 2, the source customer terminal TM first transmits a frame FL1 into the customer network 12*c*. The frame FL1 in the customer network 12*c* is an unencapsulated frame containing a customer VLAN tag 15, a source customer address CMAC (CSA) and a destination customer address CMAC (CDA). In this case, the source customer address CSA is the MAC address "CA21" and the destination customer address CDA is the MAC address "CA31". The customer VLAN tag 15 contains a customer VLAN identifier CVID arbitrarily set by a customer.

Next, as shown in FIG. 1, the switch SWB3 receives the frame FL1 and transmits a frame FL2 into the PB network 11*b*. The frame FL2 is an extended VLAN frame and is an unencapsulated frame obtained by adding a service VLAN tag 16 to the frame FL1 as shown in FIG. 2. The service VLAN (extended VLAN) tag 16 contains a service VLAN identifier SVID arbitrarily set by a service provider or the like. A broadcast domain in the PB network 11b is determined by the service VLAN identifier SVID. The switch SWB3 adds the service VLAN tag 16 to the frame FL1 based on the setting of the service provider or the like.

Subsequently, as shown in FIG. 1, the edge switch SWE2 receives the frame FL2 and transmits a frame FL3 into the PBB network 10. The frame FL3 is a PBB frame and is an encapsulated frame. The encapsulated frame generally has a configuration in which an encapsulation address is added to an unencapsulated frame based on the PBB standard. Specifically, as shown in FIG. 2, the frame FL3 has a configuration obtained by encapsulating the frame FL2 with a service instance identifier ISID, a backbone VLAN tag (B tag) 18, a source encapsulation address BMAC (BSA) and a destination encapsulation address BMAC (BDA).

The service instance identifier ISID is contained in a service instance tag (I tag) 17 with the inclusion of the above-mentioned source customer address CSA and destination customer address CDA. The service instance identifier ISID is an identifier for identifying a customer and has a 24-bit region. This 24-bit region makes it possible to further extend a 12-bit service VLAN identifier SVID. The service instance identifier ISID is arbitrarily set by a service provider or the like. As a typical setting method, for example, a method of associating one service VLAN identifier SVID with one service instance identifier ISID or a method of associating a plurality of service VLAN identifiers SVID with one service instance identifier ISID has been known.

The backbone VLAN tag (B tag) 18 contains a backbone VLAN identifier BVID. The backbone VLAN identifier BVID is an identifier for controlling relay paths and has a 12-bit region. The broadcast domain in the PBB 10 is determined by the backbone VLAN identifier BVID. The backbone VLAN identifier BVID is set by a service provider or the like. As a typical setting method, for example, a method of associating a plurality of service instance identifiers ISID with one backbone VLAN identifier BVID has been known.

Here, as shown by the address table FDB of FIG. 1, it is presupposed that the switching device SWE2 has learned the correspondence relation among the customer address CMAC "CA31", the encapsulation address BMAC "BA3" and the port identifier {Pu} of the port Pu through past communications. In this specification, for example, {AA} represents an identifier (ID) for "AA". Also, in the address table FDB, the correspondence relation between the customer address CMAC "CA21" and the port identifier {Pd[1]} is also learned from the source information upon reception of the frame FL2.

The switching device SWE2 encapsulates the frame FL2 based on "CA31" of the address table FDB so that its own MAC address "BA2" is contained as the source encapsulation address BSA and the MAC address "BA3" of the switching device SWE3 is contained as the destination encapsulation address BDA as shown by the frame FL3 of FIG. 2. Then, the switching device SWE2 transmits the frame FL3 serving as an encapsulated frame from the port (upper-link port) Pu to the switching device SWE3.

The switching device SWE3 receives the frame FL3 and learns the correspondence relation among the source customer address CSA "CA21", the source encapsulation address BSA "BA2" and the port identifier {Pu} to the address table as shown in FIG. 1. Also, since the destination encapsulation address BDA "BA3" of the frame FL3 is directed to the switching device SWE3 itself, the switching device SWE3 retrieves the address table FDB with using the destination customer address CDA "CA31" of the frame FL3 as a retrieval key.

Here, it is presupposed that the switching device SWE3 has learned the correspondence relation between "CA31" and the port identifier {Pd[1]} to the address table FDB through past communications. Thus, the switching device SWE3 acquires the port identifier {Pd[1]} and decapsulates the frame FL3 to convert it to the frame FL2.

The switching device SWE3 transmits the decapsulated frame FL2 from the port (lower-link port) Pd[1] through the PB network 11c to the switch SWB5 based on the retrieval result of the address table FDB. The switch SWB5 receives the frame FL2 and removes the service VLAN tag 16 from the frame FL2, thereby converting the frame FL2 into the frame FL1. Then, the switch SWB5 transmits the frame FL1 to the customer terminal TM having the customer address CMAC of "CA31" through the customer network 12e.

Note that, in the example of FIG. 1 and FIG. 2, the switching devices SWE2 and SWE3 transmit or receive the frame FL2 to and from the PB networks 11b and 11c, but they can transmit or receive the frame FL1 to and from the customer networks 12c and 12e according to circumstances. More specifically, the edge switching device can generate the frame FL3 by encapsulating the frame FL1 of FIG. 2 and can generate the frame FL1 by decapsulating the frame FL3. Further, although the configuration example and the operation example based on the PBB standard have been described here, they can be applied also to the EoE (Ethernet over Ethernet) standard in the same manner. An EoE frame is slightly different from the PBB frame (frame FL3) of FIG. 2 in a format, but it has substantially the same information as that of the PBB frame of FIG. 2.

<<Configuration of Relay System (Main Part)>>

Figure 3:
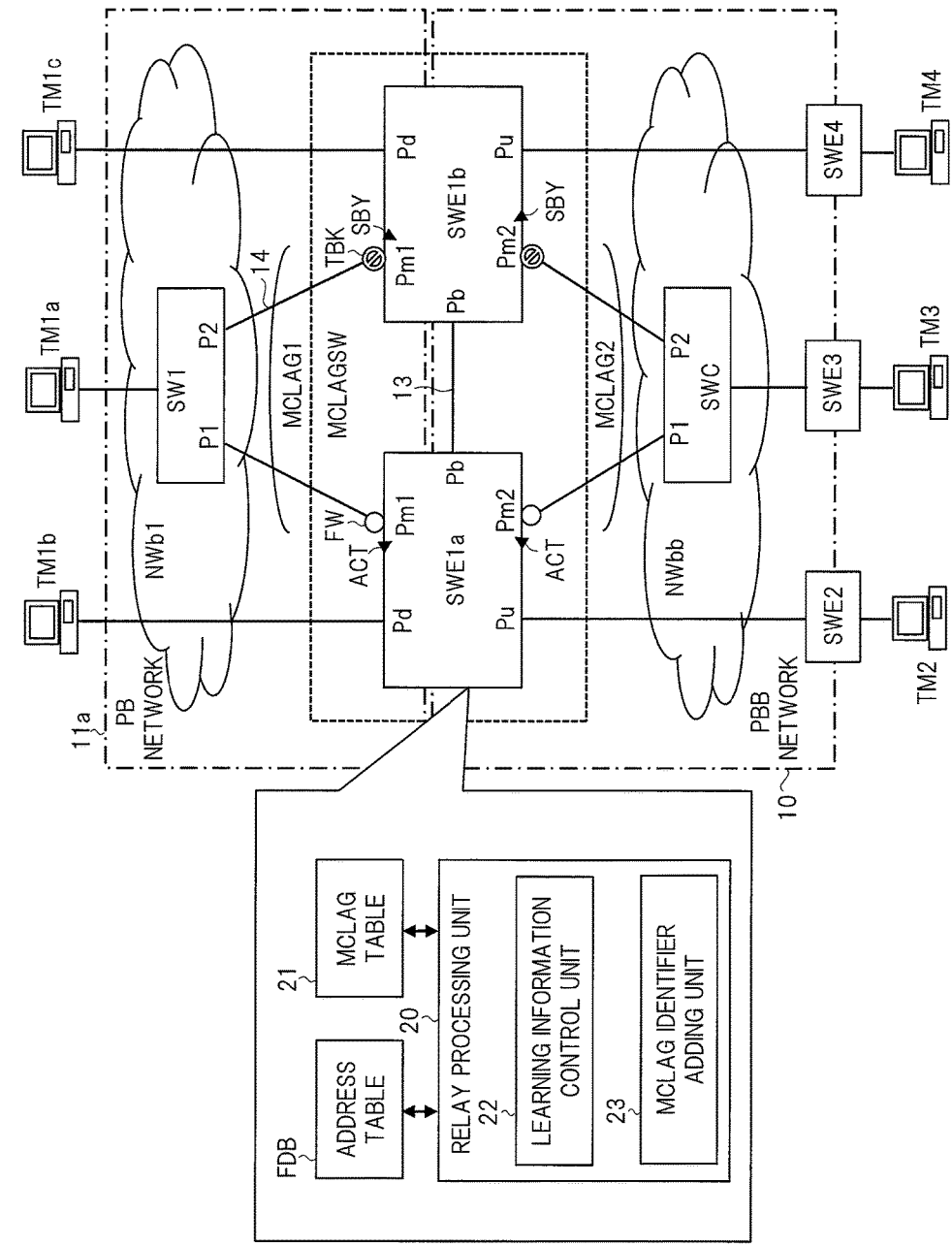
FIG. 3 is a schematic diagram showing a configuration example around the MCLAG switch in the relay system of FIG. 1.

FIG. 3 is a schematic diagram showing a configuration example around the MCLAG switch in the relay system of FIG. 1. As described above with reference to FIG. 1, the MCLAG switch MCLAGSW is made up of two switching devices (first and second switching devices) SWE1a and SWE1b. In the same manner as the operation described with reference to FIG. 1 and FIG. 2, the switching devices SWE1a and SWE1b convert an unencapsulated frame received from the outside (in this case, PB network 11a) of the PBB network 10 into an encapsulated frame and relay it to the PBB network 10. Contrary to this, the switching devices SWE1a and SWE1b convert an encapsulated frame received from the PBB network 10 into an unencapsulated frame and relay it to the outside (PB network 11a) of the PBB network. Further, the switching devices SWE1a and SWE1b relay an unencapsulated frame in the PB network 11a and relay an encapsulated frame in the PBB network 10.

Each of the switching devices SWE1a and SWE1b has lower-link ports for transmitting and receiving an unencapsulated frame and upper-link ports for transmitting and receiving an encapsulated frame. As described above with reference to FIG. 1, the lower-link ports include the port Pd and the MCLAG port (first MCLAG port) Pm1, and the upper-link ports include the port Pu and the MCLAG port (second MCLAG port) Pm2. Furthermore, the upper-link ports include the bridge port Pb. More specifically, the bridge port PB belongs to the PEE network 10. The bridge ports Pb connect one device and the peer device thereof through a communication line 13. The communication line 13 is provided as, for example, an Ethernet (registered trademark) line or provided as a dedicated line.

Also, in the example of FIG. 3, the network NWb1 of the PB network 11a has a switch SW1. The switch SW1 has LAG ports P1 and P2. The LAG port P1 is connected to the MCLAG port Pm1 of the switching device SWE1a through a communication line 14, and the LAG port P2 is connected to the MCLAG port Pm1 of the switching device SWE1b through a communication line 14. The communication line 14 is provided as, for example, an Ethernet line. The switch SW1 sets MCLAG1 on the LAG ports P1 and P2. In practice, it is only necessary for the switch SW1 to set an ordinary LAG on the LAG ports P1 and P2, and there is no need for particularly distinguishing the LAG and the MCLAG.

Similarly, the network NWbb of the PBB network 10 includes a core switch SWC. The core switch SWC has a LAG port P1 connected to the MCLAG port Pm2 of the switching device SWE1a and a LAG port P2 connected to the MCLAG port Pm2 of the switching device SWE1b. The core switch SWC sets MCLAG2 (in practice, ordinary LAG) on the LAG ports P1 and P2.

Also, FIG. 3 shows customer terminals TM1a, TM1b and TM1c and customer terminals TM2, TM3 and TM4. In the example of FIG. 1, the customer terminals TM1a, TM1b and TM1c are included in the customer networks 12a and 12b. The customer terminal TM2 is included in the customer networks 12c and 12d belonging to the lower link of the switching device SWE2, and the customer terminal TM3 is included in the customer networks 12e and 12f belonging to the lower link of the switching device SWE3. Also, the customer terminal TM4 is included in the customer network (not shown) belonging to the lower link of the switching device SWE4. In FIG. 3, as a matter of convenience, illustrations of the networks (NWc1 to NWc6) of each customer network and the switches (SWB1 to SWB6) are omitted.

The customer terminal TM1a is connected to the MCLAG ports (lower-link ports) Pm1 of the switching devices SWE1a and SWE1b via the switch SW1 in the network NWb1. The customer terminal TM1b is connected to the port (lower-link port) Pd of the switching device SWE1a through the network NWb1, and the customer terminal TM1c is connected to the port (lower-link port) Pd of the switching device SWE1b through the network NWb1.

Also, the customer terminal TM3 is connected to the MCLAG ports (upper-link ports) Pm2 of the switching devices SWE1a and SWE1b via the core switch SWC in the network NWbb. The customer terminal TM2 is connected to the port (upper-link port) Pu of the switching device SWE1a through the network NWbb, and the customer terminal TM4 is connected to the port (upper-link port) Pu of the switching device SWE1b through the network NWbb.

In this configuration, FIG. 3 shows a method in which an active ACT or a standby SBY is set to MCLAG ports serving as member ports of each MCLAG as an example of an operation method of the MCLAG switch MCLAGSW. In this example, in the MCLAG1, the MCLAG port (first MCLAG port) Pm1 of the switching device SWE1a is set to active ACT, and the MCLAG port Pm1 of the switching device SWE1b is set to standby SBY. Similarly, also in the MCLAG2, the MCLAG port (second MCLAG port) Pm2 of the switching device SWE1a is set to active ACT, and the MCLAG port Pm2 of the switching device SWE1b is set to standby SBY.

When there is no fault, the MCLAG port set to active ACT is controlled to a transmission permitted state in which transmission is permitted. In this case, as an example thereof, the MCLAG port is controlled to a transmission/reception permitted state FW in which transmission and reception are both permitted. On the other hand, the MCLAG port set to standby SBY is controlled to a transmission prohibited state in which transmission is prohibited. In this case, as an example thereof, the MCLAG port is controlled to a transmission prohibited state TBK in which transmission is prohibited and reception is permitted.

As a result, the frame from the MCLAG switch MCLAGSW to the switch SW1 is always transmitted from the MCLAG port Pm1 of the switching device SWE1a. Similarly, the frame from the MCLAG switch MCLAGSW to the core switch SWC is always transmitted from the MCLAG port Pm2 of the switching device SWE1a. On the other hand, the frame from the switch SW1 or the core switch SWC to the MCLAG switch MCLAGSW is transmitted from both of the LAG ports P1 and P2.

In this case, when a fault occurs at, for example, the MCLAG port Pm1 of the switching device SWE1a, the switching operation in the occurrence of fault is performed in the MCLAG switch MCLAGSW. Specifically, in the MCLAG1, the MCLAG port Pm1 of the switching device SWE1b is controlled to the transmission/reception permitted state FW, and the MCLAG port Pm1 of the switching device SWE1a is controlled to, for example, a transmission/reception prohibited state in which transmission and reception are both prohibited.

Note that the operation method of the MCLAG switch MCLAGSW is not limited to this method, and various methods can be used. For example, a method in which MCLAG ports to transmit frames are equally distributed to the two switching devices SWE1a and SWE1b based on distribution ID and the like has been known.

Also, FIG. 3 shows a schematic configuration example of a main part of the switching devices SWE1a and SWE1b. In this case, each of the switching devices SWE1a and SWE1b includes an address table FDB, a MCLAG table 21 and a relay processing unit 20. The relay processing unit 20 mainly learns and retrieves the address table FDB.

The MCLAG table 21 retains one or a plurality of MCLAG ports in association with one or a plurality of MCLAG identifiers, respectively. In the case of FIG. 3, the MCLAG table 21 retains the MCLAG ports Pm1 and Pm2 in association with MCLAG identifiers {MCLAG1} and {MCLAG2}, respectively. Thus, each of the switching devices SWE1a and SWE1b sets common MCLAG1 on its own MCLAG port Pm1 and the MCLAG port Pm1 of the peer device, and sets common MCLAG2 on its own MCLAG port Pm2 and the MCLAG port Pm2 of the peer device.

The address table FDB retains the customer address present ahead of a lower-link port in association with the port identifier representing the lower-link port or the MCLAG identifier corresponding to the lower-link port. For example, the address table FDB of the switching device SWE2 of FIG. 1 retains the customer address CMAC "CA21" present ahead of the port (lower-link port) Pd[1] in association with the port identifier {Pd[1] }. The address tables FDB of the switching devices SWE1a and SWE1b also retain the information similar to this.

Also, the address table FDB retains the customer address present ahead of the upper-link port in association with the encapsulation address and the port identifier representing the upper-link port or the MCLAG identifier corresponding to the upper-link port. For example, the address table FDB of the switching device SWE2 of FIG. 1 retains the customer address CMAC "CA31" present ahead of the port (upper-link port) Pu in association with the encapsulation address BMAC "BA3" and the port identifier {Pu}. The address tables FDB of the switching devices SWE1*a* and SWE1*b* also retain the information similar to this.

The relay processing unit 20 includes a learning information control unit 22 and a MCLAG identifier adding unit 23. When relaying the frame received at the MCLAG port (for example, Pm1) to the bridge port Pb, the MCLAG identifier adding unit 23 adds a MCLAG identifier ({MCLAG1}) corresponding to the MCLAG port to the frame. Though details thereof will be described later, the learning information control unit 22 controls the information learned to the address table FDB based on predetermined conditions in order to prevent the unnecessary change of the learning contents of the address table.

<<Operation to be Premise of Relay System (Main Part) and Problem>>

Figure 9:
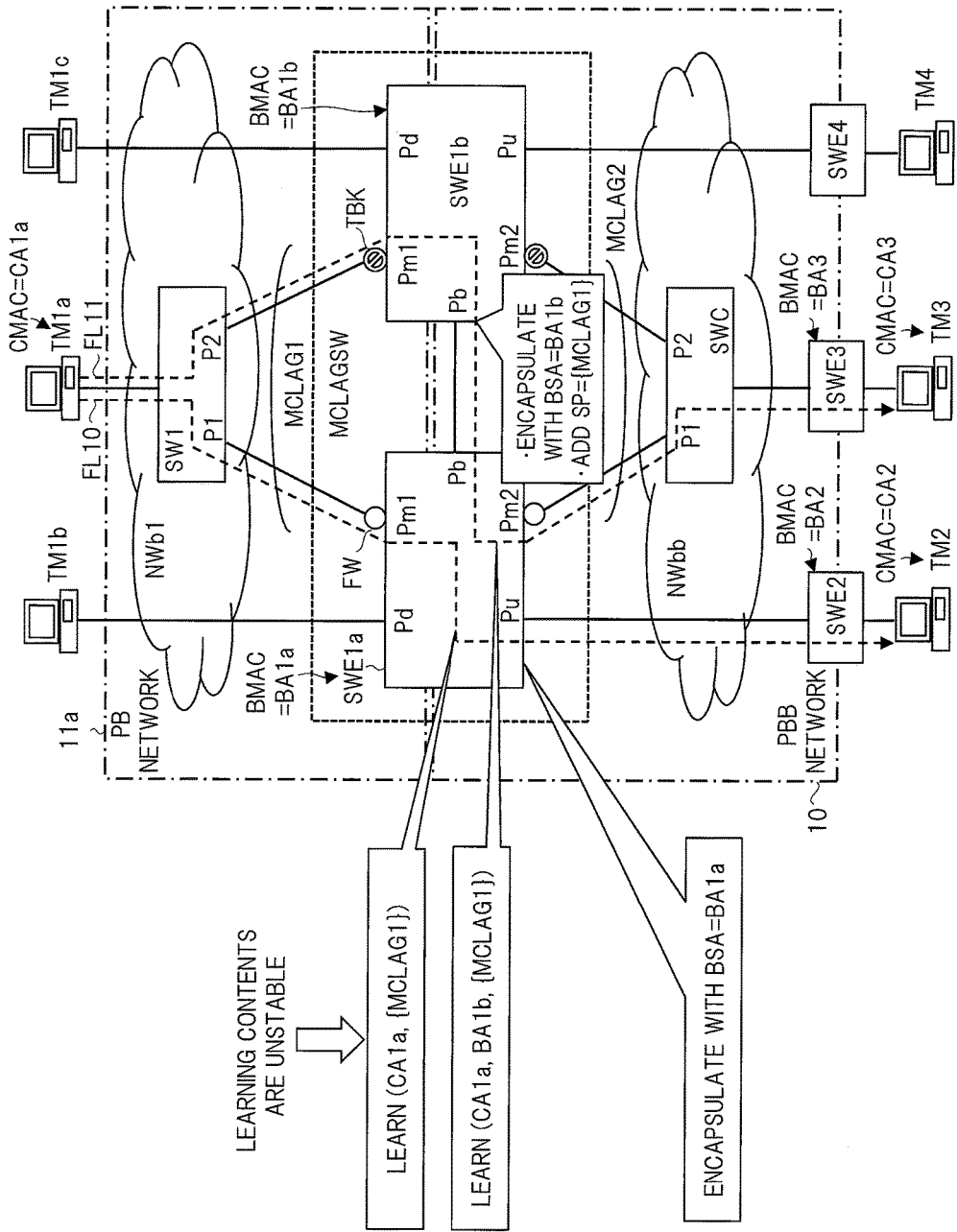
FIG. 9 is an explanatory diagram showing an operation example in the case where the relay system of FIG. 3 does not have a learning information control unit in the relay system studied as a premise of the present invention.

FIG. 9 is an explanatory diagram showing an operation example in the case where the relay system of FIG. 3 does not have the learning information control unit in the relay system studied as a premise of the present invention. In FIG. 9, it is presupposed that the customer addresses (MAC addresses) CMAC of the customer terminals TM1*a*, TM2 and TM3 are CA1*a*, CA2 and CA3, respectively. Also, it is presupposed that the encapsulation addresses (MAC addresses) BMAC of the switching devices SWE1*a*, SWE1*b*, SWE2 and SWE3 are BA1*a*, BA1*b*, BA2 and BA3, respectively.

First, the case where a frame FL10 is transferred from the customer terminal TM1*a* to the customer terminal TM2 is assumed. The switch SW1 receives the frame (here, unencapsulated frame) FL10 and relays the frame FL10 to either of the LAG port P1 or P2 based on a predetermined distribution rule. In this case, the frame FL10 is relayed to the LAG port P1.

The switching device SWE1*a* receives the frame (here, unencapsulated frame) FL10 at the MCLAG port Pm1. Then, the switching device SWE1*a* (specifically, relay processing unit 20) learns the source customer address CSA "CA1*a*" contained in the frame (unencapsulated frame) FL10 in association with the port identifier of the port which has received the frame (hereinafter, referred to as reception port identifier) to the address table FDB. In this case, the reception port identifier is the MCLAG identifier {MCLAG1}.

Also, it is presupposed that the switching device SWE1*a* has learned the correspondence relation among the customer address CMAC "CA2", the encapsulation address BMAC "BA2" and the port identifier {Pu} to the address table FDB through past communications. The switching device SWE1*a* (specifically, relay processing unit 20) retrieves the address table FDB with using the destination customer address CDA "CA2" contained in the frame (unencapsulated frame) FL10 as a retrieval key. The switching device SWE1*a* acquires the port identifier {Pu} of the port (upper-link port) Pu as the port identifier of the destination (hereinafter, referred to as destination port identifier) based on the retrieval result.

Then, the switching device SWE1*a* encapsulates the frame (unencapsulated frame) FL10 with the source encapsulation address BSA (its own encapsulation address BMAC "BA1*a*") and the destination encapsulation address BDA (encapsulation address BMAC "BA2" based on address table FDB). Then, the switching device SWE1*a* transmits the frame (here, encapsulated frame) FL10 from the upper-link port Pu.

Next, the case where a frame FL11 is transferred from the customer terminal TM1*a* to the customer terminal TM3 is assumed. The switch SW1 receives the frame (here, unencapsulated frame) FL11 and relays the frame FL11 to either of the LAG port P1 or P2 based on a predetermined distribution rule. In this case, the frame FL11 is relayed to the LAG port P2.

The switching device SWE1*b* receives the frame (here, unencapsulated frame) FL11 at the MCLAG port Pm1. Then, the switching device SWE1*b* (specifically, relay processing unit 20) learns the source customer address CSA "CA1*a*" contained in the frame (unencapsulated frame) FL11 in association with the MCLAG identifier {MCLAG1} corresponding to the reception port identifier to the address table FDB.

Also, it is presupposed that the switching device SWE1*b* has learned the correspondence relation among the customer address CMAC "CA3", the encapsulation address BMAC "BA3" and the MCLAG identifier {MCLAG2} to the address table FDB through past communications. The switching device SWE1*b* (specifically, relay processing unit 20) retrieves the address table FDB with using the destination customer address CDA "CA3" contained in the frame (unencapsulated frame) FL11 as a retrieval key. As a result, the switching device SWE1*b* acquires the MCLAG identifier {MCLAG2} as the destination port identifier.

Since the MCLAG port Pm2 of the switching device SWE1*b* itself serving as a member port of the MCLAG2 is controlled to the transmission prohibited state TBK, the switching device SWE1*b* (specifically, relay processing unit 20) determines the port identifier {Pb} of the bridge port Pb serving as the upper-link port as the transmission port identifier of the frame FL11. In other words, the switching device SWE1*b* determines the bridge port Pb as the destination port.

In this case, the transmission port identifier means a port identifier of a port to actually transmit a frame. For example, when the destination port identifier is not a MCLAG identifier but a normal port identifier (for example, {Pu}), the transmission port identifier is equivalent to the destination port identifier. Meanwhile, when the destination port identifier is a MCLAG identifier, the transmission port identifier is the port identifier ({Pm2}) of the MCLAG port (for example, Pm2) or the port identifier {Pb} of the bridge port Pb in accordance with the control state of the MCLAG port.

In this case, the transmission port identifier is the port identifier {Pb} of the bridge port Pb serving as the upper-link port. Thus, the switching device SWE1*b* encapsulates the frame (unencapsulated frame) FL11 with the source encapsulation address BSA (its own encapsulation address BMAC "BA1*b*") and the destination encapsulation address BDA (encapsulation address BMAC "BA3" based on address table FDB).

Also, when relaying the frame received at the MCLAG port Pm1 to the bridge port Pb, the switching device SWE1*b* (specifically, MCLAG identifier adding unit 23) adds the MCLAG identifier {MCLAG1} corresponding to the reception port identifier SP to the frame. Thus, the switching device SWE1*b* transmits the frame (here, encapsulated frame) FL11, to which the MCLAG identifier {MCLAG1} has been added, from the bridge port Pb.

Meanwhile, the switching device SWE1*a* receives the frame (encapsulated frame) FL11 at the bridge port Pb. Then, the switching device SWE1*a* learns the source customer address CSA "CA1*a*" contained in the frame (encapsulated frame) FL11 in association with the source encapsulation address BSA "BA1*b*" contained in the frame FL11 and the MCLAG identifier {MCLAG1} added to the frame FL11 to the address table FDB.

Also, it is presupposed that the switching device SWE1*a* has learned the correspondence relation among the customer address CMAC "CA3", the encapsulation address BMAC "BA3" and the MCLAG identifier {MCLAG2} to the address table FDB through past communications. The switching device SWE1a (specifically, relay processing unit 20) retrieves the address table FDB with using the destination encapsulation address BDA "BA3" contained in the frame (encapsulated frame) FL11 as a retrieval key. As a result, the switching device SWE1a acquires the MCLAG identifier {MCLAG2} as the destination port identifier.

Since the MCLAG port Pm2 of the switching device SWE1a itself serving as a member port of the MCLAG2 is controlled to the transmission/reception permitted state FW, the switching device SWE1a (specifically, relay processing unit 20) determines the port identifier {Pm2} as the transmission port identifier of the frame FL11. In other words, the switching device SWE1a determines the MCLAG port Pm2 as the destination port. Thus, the switching device SWE1a relays the frame (encapsulated frame) FL11 received at the bridge port Pb to the MCLAG port Pm2.

As described above, each of the switching devices (first and second switching devices) SWE1a and SWE1b generates an encapsulated frame by using its own encapsulation address when relaying an unencapsulated frame received at its own lower-link port to an upper-link port. Consequently, when the lower-link port which has received the unencapsulated frame is the MCLAG port (here, Pm1), each of the switching devices SWE1a and SWE1b learns the source customer address contained in the unencapsulated frame in different two ways.

More specifically, there are the case where the learning of the address table FDB is performed based on the unencapsulated frame (FL10) and the case where it is performed based on the encapsulated frame (FL11) like the switching device SWE1a of FIG. 9. In the former case, the encapsulation address is not learned, but in the latter case, the encapsulation address (here, BA1b) is learned. For example, when the frame FL10 and the frame FL11 are alternately generated, the learning contents of the address table FDB are frequently changed in spite of being intended for the same customer address (here, CA1a). Therefore, it is desired to prevent such an unstable situation.

Also, the switching device is sometimes provided with a function of detecting the frequent change of the learning contents intended for the same customer address and regarding it as a fault. This function is intrinsically provided for detecting the occurrence of the loop path or the like. On the other hand, since the phenomenon shown in FIG. 9 normally does not correspond to the fault, it is desired to prevent the unnecessary fault detection resulting from it.

<<Operation of Relay System (Main Part) of Present Embodiment>>

Figure 4:
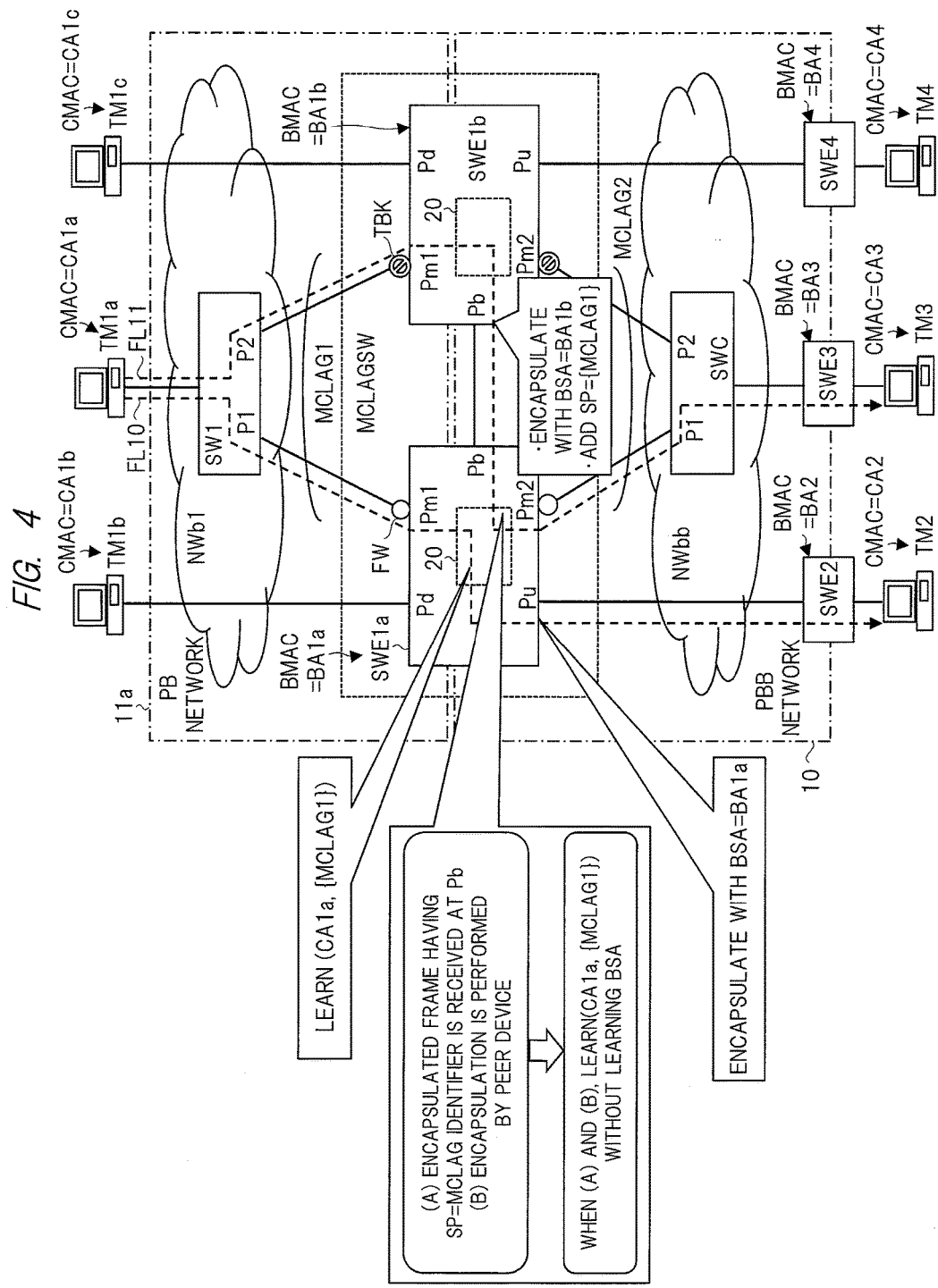
FIG. 4 is an explanatory diagram showing an operation example of the relay system of FIG. 3.

FIG. 4 is an explanatory diagram showing an operation example of the relay system of FIG. 3. Like the above-described case of FIG. 9, FIG. 4 shows the operation example in which the frame FL10 is transferred from the customer terminal TM1a to the customer terminal TM2 and the operation example in which the frame FL11 is transferred from the customer terminal TM1a to the customer terminal TM3. The operation of each part with respect to the frame FL10 is the same as that of FIG. 9.

Meanwhile, with respect to the frame FL11, the switching device SWE1a receives the frame (here, encapsulated frame) FL11, to which the MCLAG identifier {MCLAG1} has been added, at the bridge port Pb like the case of FIG. 9. At this time, the switching device SWE1a learns the address table FDB by using the learning information control unit 22 unlike the case of FIG. 9.

When the encapsulated frame to which the MCLAG identifier has been added is received at the bridge port Pb (condition (A) and the encapsulation of the frame is performed by the peer device (condition (B)), the learning information control unit 22 does not learn the source encapsulation address BSA contained in the encapsulated frame to the address table FDB. More specifically, the learning information control unit 22 learns the source customer address CSA contained in the encapsulated frame in association with the MCLAG identifier added to the encapsulated frame to the address table FDB, but does not learn the source encapsulation address BSA. Note that the learning information control unit 22 can determine whether the condition (B) is satisfied by, for example, determining whether the source encapsulation address BSA contained in the encapsulated frame is the encapsulation address of the peer device.

In the case of FIG. 4, the switching device SWE1a receives the encapsulated frame (FL11), to which the MCLAG identifier {MCLAG1} has been added, at the bridge port Pb. Further, the source encapsulation address BSA contained in the encapsulated frame (FL11) is the encapsulation address (BA1b) of the peer device (SWE1b). Therefore, since the above-described conditions (A) and (B) are both satisfied, the learning information control unit 22 does not learn the encapsulation address (BA1b) to the address table FDB. More specifically, the learning information control unit 22 learns the source customer address CSA "CA1a" contained in the encapsulated frame (FL11) in association with the MCLAG identifier {MCLAG1} added to the frame to the address table FDB.

In this manner, the learning contents of the address table FDB in the switching device SWE1a become identical between the case where the unencapsulated frame (FL10) is received and the case where the encapsulated frame (FL11) is received. As a result, it becomes possible to prevent the situation in which the learning contents of the address table FDB are unnecessarily changed described with reference to FIG. 9. Furthermore, it is also possible to prevent the unnecessary fault detection described with reference to FIG. 9.

Note that the problem described with reference to FIG. 9 may occur not only in the case of supposing the frame transfer path shown in FIG. 9 but also in the case of supposing the other transfer path. In the example of FIG. 4, the switch SW1 selects the LAG port by the hash operation using the source customer address CSA and the destination customer address CDA. In this case, the switch SW1 selects the same LAG port if the source and destination customer addresses CSA and CDA are identical to each other.

Here, for example, the case where a customer terminal (defined as TM3') different from the customer terminal TM3 is connected to the lower link of the switching device SW3 of FIG. 4 and a frame is transferred from the customer terminal TM1a to the customer terminal (TM3') instead of the frame FL10 is assumed. In this case, since the frame is different from the frame FL11 in the destination customer address CDA, the switch SW1 selects the LAG port P1 in some cases. Thus, the problem similar to that of FIG. 9 occurs.

Further, depending on the distribution rule of LAG, even when the source and destination customer addresses CSA and CDA are identical to each other, the LAG ports to be selected are arbitrarily distributed for each frame in some cases. In such a case, in the frame transfer from the customer terminal TM1a to the customer terminal TM3, the same problem may occur when the switch SW1 equally distributes the LAG ports P1 and P2 to transmit the frame. Also, in the case of the switch SW1 like this, the same problem may occur also in the frame transfer from the customer terminal TM1a to the customer terminal TM2 and in the frame transfer from the customer terminal TM1a to the customer terminal TM1b.

As described above, essentially, the problem described with reference to FIG. 9 may occur when the lower-link ports of the switching devices SWE1a and SWE1b include the MCLAG port. More specifically, the upper-link ports may be the MCLAG port (for example, Pm2) or the port on which MCLAG is not set (for example, Pu), and the lower-link ports do not have to include the port on which MCLAG is not set (for example, Pb).

However, in particular, when the operation method of the MCLAG shown in FIG. 3 and others (namely, method in which active and standby are set to MCLAG ports) is used, the problem described with reference to FIG. 9 is more likely to occur. Specifically, when relaying the frame received at the MCLAG1 to the MCLAG2, since the MCLAG port to which the frame is relayed is fixedly determined, the communication of the encapsulated frames via the bridge ports Pb is performed frequently. As a result, the problem described with reference to FIG. 9 is likely to occur. Thus, in such a case, the application of the method described with reference to FIG. 4 and others is particularly beneficial.

Also, the learning information control unit 22 can determine the conditions (A) and (B) by various ways other than the example described above. For example, the learning information control unit 22 can determine whether the condition (B) is satisfied by determining whether the MCLAG identifier added to the encapsulated frame is the MCLAG identifier of the MCLAG port serving as the lower-link port. When the MCLAG identifier of the lower-link port is added, it means that the encapsulation of the frame is performed by the peer device.

Figure 5:
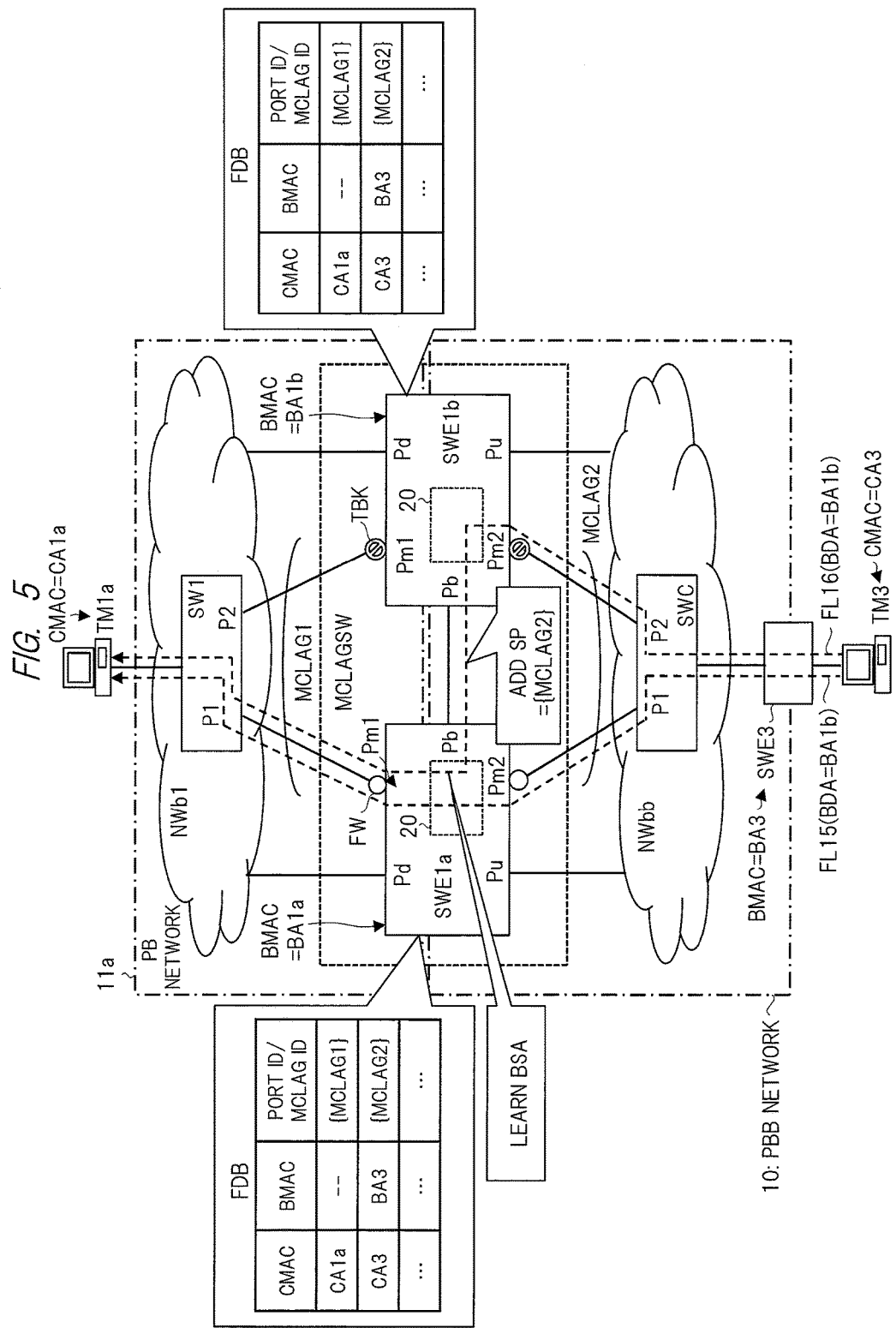
FIG. 5 is an explanatory diagram showing another operation example of the relay system of FIG. 3.

FIG. 5 is an explanatory diagram showing another operation example of the relay system of FIG. 3. FIG. 5 shows an operation example in which a frame is transferred from the customer terminal TM3 to the customer terminal TM1a contrary to the case of FIG. 4. An unencapsulated frame transmitted from the customer terminal TM3 is converted into an encapsulated frame in the switching device SWE3. At this time, the switching device SWE3 generates the encapsulated frame containing the source encapsulation address BSA "BA3" and the destination encapsulation address BDA "BA1b" based on the learning information of the address table by the frame FL11 of FIG. 4.

The core switch SWC receives the encapsulated frame and relays the encapsulated frame to either of the LAG port P1 or P2 based on a predetermined distribution rule. In FIG. 5, the frame relayed to the LAG port P1 is denoted by FL15, and the frame relayed to the LAG port P2 is denoted by FL16. The switching device SWE1a receives the frame (encapsulated frame) FL15 at the MCLAG port Pm2. Then, the switching device SWE1a (specifically, relay processing unit 20) learns the source customer address CSA "CA3" of the frame FL15 in association with the source encapsulation address BSA "BA3" and the MCLAG identifier {MCLAG} corresponding to the reception port identifier to the address table FDB.

Here, each of the switching devices SWE1a and SWE1b has a function of retrieving its own address table FDB with using the destination customer address CDA contained in the received encapsulated frame as a retrieval key when the destination encapsulation address BDA contained in the frame is its own encapsulation address or the encapsulation address of the peer device. In this case, since the destination encapsulation address BDA "BA1b" of the frame FL15 is the encapsulation address of the peer device, the switching device SWE1a (specifically, relay processing unit 20) retrieves the address table FDB with using the destination customer address CDA "CA1a" as a retrieval key.

The address table FDB of the switching device SWE1a retains the correspondence relation between the customer address CMAC "CA1a" and the MCLAG identifier {MCLAG1} by the operation described with reference to FIG. 4. Therefore, as a result of the retrieval of the address table FDB, the switching device SWE1a acquires the MCLAG identifier {MCLAG1}. Further, since the MCLAG port Pm1 of the switching device SWE1a itself serving as a member port of the MCLAG1 is controlled to the transmission/reception permitted state FW, the switching device SWE1a (specifically, relay processing unit 20) determines the port identifier {Pm1} as the transmission port identifier. In other words, the switching device SWE1a determines its own MCLAG port Pm1 as the destination port. Since the destination port is the lower-link port, the switching device SWE1a converts the received frame (encapsulated frame) FL15 into an unencapsulated frame and then relays it to the MCLAG port Pm1.

On the other hand, the switching device SWE1b receives the frame (encapsulated frame) FL16 at the MCLAG port Pm2. Then, the switching device SWE1b (specifically, relay processing unit 20) learns the source customer address CSA "CA3" of the frame FL16 in association with the source encapsulation address BSA "BA3" and the MCLAG identifier {MCLAG2} corresponding to the reception port identifier to the address table FDB. Also, since the destination encapsulation address BDA "BA1b" of the frame FL16 is the encapsulation address of the switching device SWE1b itself, the switching device SWE1b (specifically, relay processing unit 20) retrieves the address table FDB with using the destination customer address CDA "CA1a" as a retrieval key.

The address table FDB of the switching device SWE1b retains the correspondence relation between the customer address CMAC "CA1a" and the MCLAG identifier {MCLAG} by the operation described with reference to FIG. 4. Therefore, as a result of the retrieval of the address table FDB, the switching device SWE1b acquires the MCLAG identifier {MCLAG1}. Further, since the MCLAG port Pm1 of the switching device SWE1b itself serving as a member port of the MCLAG1 is controlled to the transmission prohibited state TBK, the switching device SWE1b (specifically, relay processing unit 20) determines the bridge port Pb as the destination port.

Since the destination port is the upper-link port, the switching device SWE1b relays the received frame (encapsulated frame) FL16 as it is (without decapsulation) to the bridge port Pb. At this time, the switching device SWE1b (specifically, MCLAG identifier adding unit 23) adds the MCLAG identifier {MCLAG2} corresponding to the reception port identifier SP to the frame FL16.

The switching device SWE1a receives the frame (encapsulated frame) FL16, to which the MCLAG identifier {MCLAG2} has been added, at the bridge port Pb. In this case, unlike the case of FIG. 4, since the source encapsulation address BSA "BA3" is not the encapsulation address of the peer device, the switching device SWE1a (specifically, learning information control unit 22) learns the source encapsulation address BSA. More specifically, the switching device SWE1a (learning information control unit 22) learns the source customer address CSA "CA3" contained in the frame FL16 in association with the source encapsulation address BSA "BA3" and the MCLAG identifier {MCLAG2} added to the frame FL16 to the address table FDB.

Also, since the destination encapsulation address BDA "BA1b" of the frame FL16 is the encapsulation address of the peer device, the switching device SWE1a (specifically, relay processing unit 20) retrieves the address table FDB with using the destination customer address CDA "CA1a" as a retrieval key. As a result, like the case of the frame FL15, the switching device SWE1a acquires the MCLAG identifier {MCLAG} and then relays the frame (unencapsulated frame) FL16 to the MCLAG port Pm1 through the same process as that of the frame FL15.

<<Details of Switching Device>>

Figure 6:
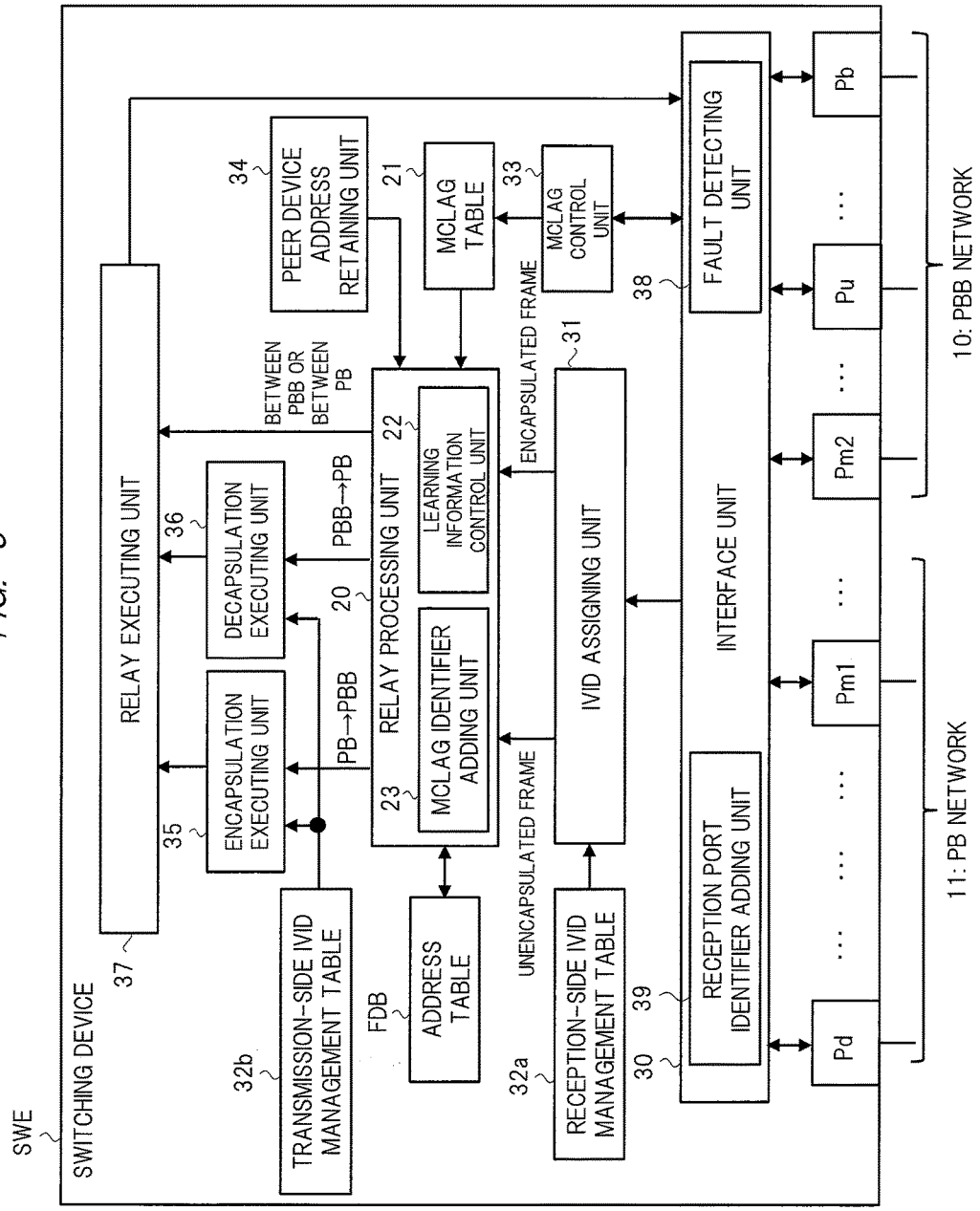
FIG. 6 is a block diagram showing a configuration example of the main part of the switching device constituting the MCLAG switch in the relay system of FIG. 3.

FIG. 6 is a block diagram showing a configuration example of the main part of the switching device constituting the MCLAG switch in the relay system of FIG. 3. FIG. 7 is a schematic diagram showing a configuration example of the address table in FIG. 6. FIG. 8A is a schematic diagram showing a configuration example of the reception-side IVID management table in FIG. 6, FIG. 8B is a schematic diagram showing a configuration example of the transmission-side IVID management table in FIG. 6, and FIG. 8C is a schematic diagram showing a configuration example of the MCLAG table in FIG. 6.

The switching device SWE shown in FIG. 6 includes lower-link ports connected to the outside of the PBB network 10 (for example, PB network 11), upper-link ports connected to the PBB network 10, various processing units and various tables. The lower-link ports include at least a MCLAG port and include the MCLAG port Pm1 and the port Pd on which MCLAG is not set in the example of FIG. 6. The upper-link ports include the bridge port Pb and a port which is indifferent about whether the MCLAG is set and include the MCLAG port Pm2 and the port Pu on which the MCLAG is not set in the example of FIG. 6. Hereinafter, various processing units and tables will be described.

An interface unit 30 includes a reception buffer and a transmission buffer, transmits or receives an unencapsulated frame to or from the lower-link ports (Pd, Pm1), and transmits or receives an encapsulated frame to or from the upper-link ports (Pm2, Pu, Pb). Further, the interface unit 30 includes a fault detecting unit 38 and a reception port identifier adding unit 39. When a frame is received at any of the plurality of ports, the reception port identifier adding unit 39 adds a reception port identifier to the frame.

The fault detecting unit 38 detects presence or absence of fault (presence or absence of link down) for each of the plurality of ports by hardware. For example, the fault detecting unit 38 monitors a received optical signal level and detects the presence of link down when an abnormal state such as the insufficiency of the optical signal level continues for a predetermined period. Alternatively, the fault detecting unit 38 monitors the presence or absence of link pulse signal generated in an idle state and the presence or absence of data signal in a non-idle state based on received signals, and detects the presence of link down when an abnormal state such as the absence of both of link pulse signal and data signal continues for a predetermined period.

An IVID assigning unit 31 assigns an internal VLAN identifier IVID to an unencapsulated frame received at the lower-link port or an encapsulated frame received at the upper-link port based on a reception-side IVID management table 32a determined in advance by a service provider or the like. As shown in FIG. 8A, the reception-side IVID management table 32a retains the combination of the service VLAN identifier SVID and the reception port identifier in association with the internal VLAN identifier IVID.

The service VLAN identifier SVID is contained in an unencapsulated frame, and the reception port identifier is added to the unencapsulated frame by the reception port identifier adding unit 39. The IVID assigning unit 31 acquires the internal VLAN identifier IVID corresponding to the service VLAN identifier SVID and the reception port identifier from the reception-side IVID management table 32a, and adds the internal VLAN identifier IVID to an unencapsulated frame to transmit it to the relay processing unit 20.

Also, as shown in FIG. 8A, the reception-side IVID management table 32a retains the combination of the backbone VLAN identifier BVID and the reception port identifier in association with the internal VLAN identifier IVID. The backbone VLAN identifier BVID is contained in an encapsulated frame, and the reception port identifier is added to the encapsulated frame by the reception port identifier adding unit 39. The IVID assigning unit 31 acquires the internal VLAN identifier IVID corresponding to the backbone VLAN identifier BVID and the reception port identifier from the reception-side IVID management table 32a, and adds the internal VLAN identifier IVID to an encapsulated frame to transmit it to the relay processing unit 20.

As shown in FIG. 8C, the MCLAG table 21 retains one or a plurality of MCLAG ports in association with one or a plurality of MCLAG identifiers, respectively. Further, in this example, the MCLAG table 21 retains also a control state of each MCLAG port. In the example of FIG. 8C, the port identifier {Pm1} representing the MCLAG port Pm1 is associated with the MCLAG identifier {MCLAG1} and is controlled to the transmission/reception permitted state FW. Also, the port identifier {Pm2} representing the MCLAG port Pm2 is associated with the MCLAG identifier {MCLAG2} and is controlled to the transmission/reception permitted state FW.

As shown in FIG. 7, the address table FDB retains the customer address present ahead of a lower-link port in association with the port identifier representing the lower-link port or the MCLAG identifier corresponding to the lower-link port and the internal VLAN identifier IVID. Also, the address table FDB retains the customer address present ahead of an upper-link port in association with the encapsulation address, the port identifier representing the upper-link port or the MCLAG identifier corresponding to the upper-link port and the internal VLAN identifier IVID.

FIG. 7 shows the address table FDB of the switching device SWE1a of FIG. 4 as an example. The customer address which is not described in FIG. 4 will be described here. Customer addresses CA1b, CA1c and CA4 in FIG. 7 are MAC addresses of the customer terminals TM1b, TM1c and TM4 in FIG. 4, respectively. Also, an encapsulation address BA4 in FIG. 7 is a MAC address of the switching device SWE4 in FIG. 4. In the address table FDB, for example, these customer addresses CA1b, CA1c and CA4 are retained in the states described below.

The customer address CA1b present ahead of the port (lower-link port) Pd is retained in association with the port identifier {Pd} and the internal VLAN identifier IVID "xxx". Also, the customer address CA1c present ahead of the bridge port (upper-link port) Pb is retained in association with the encapsulation address BMAC "BA1b", the port identifier {Pb} and the internal VLAN identifier IVID "xxx". Further, the customer address CA4 present ahead of the bridge port (upper-link port) Pb is retained in association with the encapsulation address BMAC "BA4", the port identifier {Pb} and the internal VLAN identifier IVID "xxx".

For example, the MCLAG control unit 33 controls the operation of the MCLAG switch MCLAGSW by transmitting and receiving various control frames. One example of the control frames is a MCLAG control frame for performing the transmission and reception to and from a peer device at regular intervals via bridge ports Pb. By the transmission and the reception of the MCLAG control frame, the fault information can be shared between the respective switching devices and the living of the respective switching devices can be confirmed.

Also, as another example, the control frames may include a control frame such as Ethernet OAM (Operations, Administration, and Maintenance). In the Ethernet OAM, for example, the continuity with an outside df the device can be monitored by transmitting and receiving a control frame (test frame) referred to as CCM (Continuity Check Message) or the like at regular intervals. In this manner, for example, the presence or absence of fault at the MCLAG ports Pm1 and Pmt can be detected.

The MCLAG control unit 33 determines the control state of each MCLAG port in the MCLAG table 21 based on the fault information from the fault detecting unit 38, the fault information acquired from a MCLAG control frame or CCM, and setting information of active ACT and standby SBY determined in advance. Specifically, when the MCLAG port of its own device has a fault, the MCLAG control unit 33 controls the MCLAG port to the transmission/reception prohibited state.

Also, when the MCLAG port of its own device has no fault and is set to the active ACT, the MCLAG control unit 33 controls the MCLAG port to the transmission/reception permitted state FW. Further, when the MCLAG port of its own device has no fault and is set to the standby SBY, the MCLAG control unit 33 controls the MCLAG port of its own device in accordance with the presence or absence of fault at the MCLAG port on an active ACT side.

Specifically, when the MCLAG port on the active ACT side has no fault, the MCLAG control unit 33 controls the MCLAG port of its own device to the transmission prohibited state TBK, and when the MCLAG port on the active ACT side has a fault, the MCLAG control unit 33 controls the MCLAG port of its own device to the transmission/reception permitted state FW. The information of the presence or absence of fault at the MCLAG port on the active ACT side can be acquired by the MCLAG control frame described above.

The relay processing unit 20 includes the learning information control unit 22 and the MCLAG identifier adding unit 23, and performs the learning and retrieval of the address table FDB when receiving a frame at a port as described with reference to FIG. 4, FIG. 5, FIG. 9 and others. Specifically, when receiving a frame at a port, the relay processing unit 20 learns various kinds of information shown in FIG. 7 to the address table FDB in accordance with whether the frame is an unencapsulated frame or an encapsulated frame. In addition, when the frame is an encapsulated frame, the operation by the learning information control unit 22 is also performed as described with reference to FIG. 4 and FIG. 5.

In the address table FDB of FIG. 7, the internal VLAN identifier IVID is determined by the IVID assigning unit 31. The port identifier in the port ID/MCLAG ID is determined by the reception port identifier adding unit 39. The MCLAG identifier in the port ID/MCLAG ID is determined with reference to the MCLAG table 21 based on the reception port identifier added by the reception port identifier adding unit 39. Also, when receiving a frame to which a MCLAG identifier is added from the peer device, the MCLAG identifier in the port ID/MCLAG ID is determined to be the MCLAG identifier.

Also, when receiving an unencapsulated frame, the relay processing unit 20 retrieves the address table FDB with using the destination customer address CDA contained in the frame and the internal VLAN identifier IVID added to the frame as retrieval keys, thereby acquiring the destination port identifier and the destination encapsulation address BDA. On the other hand, when receiving an encapsulated frame, the relay processing unit 20 performs the following processes in accordance with the destination encapsulation address BDA contained in the frame.

First, when the destination encapsulation address BDA is the encapsulation address of its own device or the peer device, the relay processing unit 20 retrieves the address table FDB with using the destination customer address CDA contained in the frame and the internal VLAN identifier IVID added to the frame as retrieval keys, thereby acquiring the destination port identifier. The encapsulation address of the peer device is retained in a peer device address retaining unit 34 in advance. On the other hand, when the destination encapsulation address BDA is not the encapsulation address of its own device or the peer device, the relay processing unit 20 retrieves the address table FDB with using the destination encapsulation address BDA contained in the frame and the internal VLAN identifier IVID added to the frame as retrieval keys, thereby acquiring the destination port identifier.

Then, when the destination port identifier acquired in the above-described manner is not the MCLAG identifier but the normal port identifier, the relay processing unit 20 determines the destination port identifier as the transmission port identifier. On the other hand, when the destination port identifier is the MCLAG identifier, the relay processing unit 20 determines the control state of the MCLAG port of its own device serving as a member port of the MCLAG identifier based on the MCLAG table 21. When the control state of the MCLAG port of its own device is the transmission/reception permitted state FW, the relay processing unit 20 determines the port identifier of the MCLAG port as the transmission port identifier, and when the control state is the transmission prohibited state TBK, the relay processing unit 20 determines the port identifier {Pb} of the bridge port Pb as the transmission port identifier.

The relay processing unit 20 adds the transmission port identifier determined in the above-described manner to the frame. At this time, when the reception port identifier is the MCLAG identifier, the MCLAG identifier adding unit 23 further adds the MCLAG identifier to the frame. Then, the relay processing unit 20 transmits the frame to a different processing unit in accordance with the correspondence relation between the reception port identifier and the transmission port identifier.

Specifically, when the reception port identifier is the lower-link port and the transmission port identifier is the upper-link port, the relay processing unit 20 transmits an unencapsulated frame to an encapsulation executing unit 35. Also, when the reception port identifier is the upper-link port and the transmission port identifier is the lower-link port, the relay processing unit 20 transmits an encapsulated frame to a decapsulation executing unit 36. Further, when both of the reception port identifier and the transmission port identifier are the lower-link ports or the upper-link ports, the relay processing unit 20 transmits a frame to a relay executing unit 37.

The encapsulation executing unit 35 converts the received unencapsulated frame into an encapsulated frame. At this time, the encapsulation executing unit 35 determines an encapsulation address of its own device as the source encapsulation address BSA, and determines the destination encapsulation address BDA acquired by the relay processing unit 20 as the destination encapsulation address BDA. Furthermore, the encapsulation executing unit 35 determines the service instance identifier ISID and the backbone VLAN identifier BVID based on a transmission-side IVID management table 32b determined in advance by a service provider or the like.

As shown in FIG. 8B, the transmission-side IVID management table 32b retains the combination of the internal VLAN identifier IVID and the transmission port identifier in association with the service instance identifier ISID and the backbone VLAN identifier BVID. The internal VLAN identifier IVID is added to the unencapsulated frame by the IVID assigning unit 31, and the transmission port identifier is added to the frame by the relay processing unit 20. Based on this, the encapsulation executing unit 35 generates an encapsulated frame containing the service instance identifier ISID and the backbone VLAN identifier BVID, and transmits it to the relay executing unit 37.

The decapsulation executing unit 36 converts the received encapsulated frame into an unencapsulated frame. At this time, the decapsulation executing unit 36 determines the service VLAN identifier SVID based on the transmission-side IVID management table 32b. As shown in FIG. 8B, the transmission-side IVID management table 32b retains the combination of the internal VLAN identifier IVID and the transmission port identifier in association with the service VLAN identifier SVID other than the information described above. Based on this, the decapsulation executing unit 36 generates an unencapsulated frame containing the service VLAN identifier SVID, and transmits it to the relay executing unit 37.

The relay executing unit 37 transmits the above-described frames from each of the processing units (unencapsulated frame and encapsulated frame) to a predetermined transmission buffer in the interface unit 30. The predetermined transmission buffer corresponds to the transmission port identifier added to the frame. At this time, the relay executing unit 37 deletes the unnecessary information added to the frame (for example, internal VLAN identifier IVID and transmission port identifier). The transmission buffer in the interface unit 30 receives the frame from the relay executing unit 37, and transmits the frame to a corresponding port (that is, lower-link port or upper-link port corresponding to transmission port identifier).

As described above, by using the relay system and switching device of the present embodiment, typically, it becomes possible to prevent the situation in which the learning contents of the address table are unnecessarily changed. Note that the configuration example in which the conversion between the service VLAN identifier SVID and the service instance identifier ISID and backbone VLAN identifier BVID is performed via the internal VLAN identifier IVID has been described with reference to FIG. 6, but the configuration in which the conversion therebetween is performed without the internal VLAN identifier IVID can be used. For example, it is also possible to determine the correspondence relation between the service VLAN identifier SVID and the service instance identifier ISID and backbone VLAN identifier BVID in a table and perform the conversion by using the table. In this case, the backbone VLAN identifier BVID needs to be learned to the address table FDB instead of the internal VLAN identifier IVID.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A relay system comprising:
a first switching device and a second switching device which are disposed at entrance or exit of a Provider Backbone Bridge (PBB) network in which relaying based on a PBB standard is performed, the first and second switching devices converting an unencapsulated frame received from outside of the PBB network into an encapsulated frame and relaying the encapsulated frame to the PBB network, and the first and second switching devices converting the encapsulated frame received from the PBB network into the unencapsulated frame and relaying the unencapsulated frame to the outside of the PBB network,
wherein the unencapsulated frame contains a customer address,
the encapsulated frame has a configuration in which an encapsulation address is added to the unencapsulated frame based on the PBB standard,
each of the first switching device and the second switching device includes:
a lower-link port which transmits or receives the unencapsulated frame;
an upper-link port which transmits or receives the encapsulated frame;
one or a plurality of multi-chassis link aggregation group (MCLAG) ports which include a first MCLAG port serving as the lower-link port and on which an inter-device LAG is set;
a bridge port which serves as the upper-link port and connects one device and a peer device;
an address table which retains the customer address present ahead of the lower-link port in association with a port identifier representing the lower-link port or a MCLAG identifier corresponding to the lower-link port and retains the customer address present ahead of the upper-link port in association with the encapsulation address and a port identifier representing the upper-link port or a MCLAG identifier corresponding to the upper-link port; and
a relay processing unit, comprising a processor, which learns and retrieves the address table, and
the processor is configured to:
when a frame received at the MCLAG port is relayed to the bridge port, add a MCLAG identifier corresponding to the MCLAG port to the frame;

when the encapsulated frame to which the MCLAG identifier has been added is received at the bridge port and encapsulation of the frame is performed by the peer device, learn a source customer address contained in the encapsulated frame in association with the MCLAG identifier added to the encapsulated frame to the address table, and not learn the encapsulation address contained in the encapsulated frame to the address table; and determine whether a source encapsulation address contained in the encapsulated frame is the encapsulation address of the peer device, thereby determining whether the encapsulation of the frame is performed by the peer device.

2. The relay system according to claim 1,
wherein, when each of the first switching device and the second switching device relays the unencapsulated frame received at its own first MCLAG port to the upper-link port, each of the first switching device and the second switching device generates the encapsulated frame by using its own encapsulation address.

3. The relay system according to claim 1,
wherein one of the first MCLAG ports of the first switching device and the second switching device is set to a transmission permitted state and the other thereof is set to a transmission prohibited state in advance, and
when relaying a frame to the MCLAG port based on a retrieval result of the address table, the processor is configured to relay the frame to the MCLAG port of its own device when the MCLAG port of its own device is in the transmission permitted state, and relay the frame to the bridge port when the MCLAG port of its own device is in the transmission prohibited state.

4. The relay system according to claim 3,
wherein the one or plurality of MCLAG ports further include a second MCLAG port serving as the upper-link port.

5. The relay system according to claim 1,
wherein, when a destination encapsulation address contained in the received encapsulated frame is the encapsulation address of its own device or the peer device, the processor is configured to retrieve an address table of its own device with using a destination customer address contained in the encapsulated frame as a retrieval key.

6. A switching device which is disposed at entrance or exit of a Provider Backbone Bridge (PBB) network in which relaying based on a PBB standard is performed, the switching device converting an unencapsulated frame received from outside of the PBB network into an encapsulated frame and relaying the encapsulated frame to the PBB network, and the switching device converting the encapsulated frame received from the PBB network into the unencapsulated frame and relaying the unencapsulated frame to the outside of the PBB network,
wherein the unencapsulated frame contains a customer address,
the encapsulated frame has a configuration in which an encapsulation address is added to the unencapsulated frame based on the PBB standard,
the switching device further includes:
a lower-link port which transmits or receives the unencapsulated frame;
an upper-link port which transmits or receives the encapsulated frame;
one or a plurality of multi-chassis link aggregation group (MCLAG) ports which include a first MCLAG port serving as the lower-link port and on which an inter-device LAG is set;
a bridge port which serves as the upper-link port and connects one device and a peer device;
an address table which retains the customer address present ahead of the lower-link port in association with a port identifier representing the lower-link port or a MCLAG identifier corresponding to the lower-link port and retains the customer address present ahead of the upper-link port in association with the encapsulation address and a port identifier representing the upper-link port or a MCLAG identifier corresponding to the upper-link port; and
a relay processing unit, comprising a processor, which learns and retrieves the address table, and
the processor is configured to:
when a frame received at the MCLAG port is relayed to the bridge port, add a MCLAG identifier corresponding to the MCLAG port to the frame;
when the encapsulated frame to which the MCLAG identifier has been added is received at the bridge port and encapsulation of the frame is performed by the peer device, learn a source customer address contained in the encapsulated frame in association with the MCLAG identifier added to the encapsulated frame to the address table, and not learn the encapsulation address contained in the encapsulated frame to the address table; and
determine whether a source encapsulation address contained in the encapsulated frame is the encapsulation address of the peer device, thereby determining whether the encapsulation of the frame is performed by the peer device.

7. The switching device according to claim 6,
wherein, when the switching device relays the unencapsulated frame received at the first MCLAG port to the upper-link port, the switching device generates the encapsulated frame by using its own encapsulation address.

8. The switching device according to claim 6,
wherein one of the first MCLAG ports of the switching device and the peer device is set to a transmission permitted state and the other thereof is set to a transmission prohibited state in advance, and
when relaying a frame to the MCLAG port based on a retrieval result of the address table, the processor is configured to relay the frame to the MCLAG port of its own device when the MCLAG port of its own device is in the transmission permitted state, and relay the frame to the bridge port when the MCLAG port of its own device is in the transmission prohibited state.

9. The switching device according to claim 8,
wherein the one or plurality of MCLAG ports further include a second MCLAG port serving as the upper-link port.

10. The switching device according to claim 6,
wherein, when a destination encapsulation address contained in the received encapsulated frame is the encapsulation address of its own device or the peer device, the processor is configured to retrieve an address table of its own device with using a destination customer address contained in the encapsulated frame as a retrieval key.

* * * * *